United States Patent [19]
Sethi et al.

[11] 3,873,415
[45] Mar. 25, 1975

[54] PROCESS FOR REDUCING THE AMOUNT OF CALCIUM CONTAINED IN SODIUM-BASE WASTE SULFITE LIQUOR BY THE USE OF A SODIUM AND/OR AN AMMONIUM COMPOUND AND ADDITIONAL CALCIUM

[75] Inventors: Bal Krishan Sethi, Rexdale, Ontario; Toivo Lahtvee, Scarborough, Ontario; William Hubbard Stark, Toronto, Ontario, all of Canada

[73] Assignee: Spring Chemicals Limited, Toronto, Ontario, Canada

[22] Filed: May 3, 1973

[21] Appl. No.: 356,716

[52] U.S. Cl. .................................. 162/36, 423/512
[51] Int. Cl. .................................. D21c 11/02
[58] Field of Search ................ 162/36; 210/53; 423/512,517

[56] References Cited
UNITED STATES PATENTS

| | | | |
|---|---|---|---|
| 1,834,845 | 12/1931 | Jones | 210/53 |
| 2,644,748 | 7/1953 | Cunningham | 162/36 |
| 2,739,039 | 3/1956 | Phelps | 162/36 X |
| 2,750,290 | 6/1956 | Schoeffel | 162/36 X |
| 3,719,705 | 3/1973 | Mita et al. | 162/36 X |
| 3,740,309 | 6/1973 | Lahtvee et al. | 162/36 |
| 3,794,718 | 2/1974 | Lahtvee et al. | 423/512 |
| 3,812,235 | 5/1974 | Robinson | 423/512 X |

*Primary Examiner*—S. Leon Bashore
*Assistant Examiner*—Richard V. Fisher
*Attorney, Agent, or Firm*—Burns, Doane, Swecker & Mathis

[57] ABSTRACT

The amount of calcium contained in sodium-base waste sulfite liquor is reduced by precipitating the calcium as calcium sulfite and separating the precipitate from the remaining waste sulfite liquor solution. The precipitation is caused by dissolving in the waste sulfite liquor (1) additional calcium, i.e., beyond the amount of calcium initially contained in the waste sulfite liquor; (2) a sodium or an ammonium compound or a combination thereof selected from the group consisting of sodium oxide, sodium sulfite, sodium carbonate, sodium bisulfite, sodium hydroxide, anhydrous ammonia, ammonium sulfite, aqueous ammonia, ammonium carbonate, ammonium magnesium carbonate and ammonium hydroxide; and (3) a source of sulfite ions.

13 Claims, No Drawings

3,873,415

PROCESS FOR REDUCING THE AMOUNT OF CALCIUM CONTAINED IN SODIUM-BASE WASTE SULFITE LIQUOR BY THE USE OF A SODIUM AND/OR AN AMMONIUM COMPOUND AND ADDITIONAL CALCIUM

This invention relates to a process for treating sodium-base waste sulfite liquor. More particularly, the present invention relates to a process for precipitating calcium from sodium-base waste sulfite liquor as calcium sulfite.

BACKGROUND OF THE INVENTION

Sulfite pulping processes are a group of commonly used processes for obtaining pulp from wood or other cellulosic materials. In the sulfite processes, the cellulosic materials are normally treated with an aqueous solution containing an alkali metal bisulfite, alkaline earth metal bisulfite, or ammonium bisulfite. In some instances, when less sulfur dioxide is present in the aqueous solutions, all or portions of the metal or the ammonium cations may be present in the monosulfite, i.e., neutral sulfite, form. In still other instances, excess sulfur dioxide may be present in the solutions, over and above the amount necessary to maintain the cations in the bisulfite form, thus giving rise to what is specifically referred to as an acid sulfite solution. All of these solutions are usually collectively or generically referred to as sulfite cooking liquors.

Sulfite cooking liquors dissolve much of the lignin, some of the hemi-cellulose, as well as other components of the cellulosic material employed, leaving the majority of the cellulose fibers undissolved. The undissolved cellulose fibers are separated from the solution and the remaining solution containing the dissolved components is known as spent or waste sulfite liquor. The waste sulfite liquor has dissolved therein lignosulfonates and other organic and inorganic compounds of the cation used in the cooking liquor, and of any other cations that may have been present in the sulfite cooking liquor or the cellulosic material.

One of the commonly used sulfite cooking liquors contains sodium as the principal cation, and accordingly, the resulting waste sulfite liquor is known as sodium-base waste sulfite liquor.

The sodium-base waste sulfite liquor solutions contain valuable chemicals such as organic and inorganic salts of sodium, sulfur in various forms, and a number of organic constituents. As a result, efforts have been made to develop methods for recovering these valuable components, and particularly for recovering sulfur dioxide and sodium for use in the preparation of fresh sulfite cooking liquor and for recovering heating values from the organics.

Some of the recovery processes suggested heretofore have included subjecting the sodium-base waste sulfite liquor solutions to evaporation and burning operations. Unfortunately, because of the amounts of calcium compounds present in the waste liquor, serious scaling problems frequently occur in the evaporators, particularly when evaporating a sodium-base waste sulfite liquor resulting from the use of sodium bisulfite or sodium acid sulfite cooking liquor.

The calcium present in sodium-base waste sulfite liquor comes from the wood used in the pulping process, from impurities in the water used to make the sulfite cooking solution, and from the various chemicals used in the cooking process.

OBJECTS AND SUMMARY OF THE INVENTION

A primary object of the present invention is to provide a process for reducing the amount of calcium contained in sodium-base waste sulfite liquor, and particularly those waste liquors resulting from the use of a sodium bisulfite or sodium acid sulfite cooking liquor.

A further object is to provide a process for reducing the calcium content of sodium-base waste sulfite liquor which is more economical and effective than those processes used heretofore.

Other objects of the present invention will be apparent to those skilled in the art from the following more detailed description.

According to the present invention, a source of sulfite ions, "additional" calcium (that is, calcium in excess of the amount present in the sodium-base waste sulfite liquor obtained from the sulfite pulping process) and at least one member selected from the class consisting of sodium oxide, sodium sulfite, sodium bisulfite, sodium carbonate, sodium hydroxide, anhydrous ammonia, ammonium sulfite, aqueous ammonia, ammonium carbonate, ammonium magnesium carbonate and ammonium hydroxide are all dissolved in a sodium-base waste sulfite liquor. These materials are added to the sodium-base waste sulfite liquor to precipitate the calcium therefrom as calcium sulfite.

The essence of the present invention is the surprising discovery that by adding calcium to the sodium-base waste sulfite liquor, any given level of calcium reduction can be obtained using less sulfite ions and less sodium or ammonium compound than when no added calcium is employed.

In its broadest aspect, the present invention is intended to cover dissolving any additional amount of calcium in the sodium-base waste sulfite liquor in excess of the amount of calcium contained in the spent or waste liquor recovered from the sulfite pulping process. In one of its preferred aspects, calcium is added in an amount sufficient to yield a waste sulfite liquor containing up to about 4,000 ppm of dissolved calcium prior to precipitation of calcium sulfite.

DETAILED DESCRIPTION OF THE PREFERRED EMBODIMENTS

The term "sodium-base waste sulfite liquor" as used herein is intended to include all waste sulfite cooking liquors obtained from pulping processes wherein the original sulfite cooking liquor contains sodium as the major or principal cation on a mole percent basis. It is to be understood that the original sulfite cooking liquor can be of any specific type, ranging from neutral to the acid sulfite form depending on the amount of sulfur dioxide dissolved therein. The only requirement is that sodium be the major or principal cation. Sodium-base waste sulfite liquors, and particularly those resulting from a bisulfite or acid sulfite cooking liquor, usually contain between about 4,000 and 20,000 ppm of sodium, between about 200 and 1,200 ppm of calcium and below about 200 ppm of other cations such as strontium, barium, iron, aluminum, magnesium, potassium, and the like. In many instances, a waste liquor resulting from a neutral sodium sulfite cooking liquor will contain less than about 200 ppm of calcium and thus treatment according to the present invention may not be necessary.

The pH of the sodium-base waste sulfite liquor as obtained from the pulping processes is normally between about 1.5 and 4.5 when the original cooking liquor was of the bisulfite or acid sulfite form. However, when a neutral sodium sulfite cooking liquor is used the pH of the resulting waste sulfite liquor is normally between about 6.5 and 7.5 or higher.

The calcium in sodium-base waste sulfite liquor is normally dissolved in the liquor in the form of various organic and inorganic salts such as lignosulfonates, oxalates, acetates and sulfates as well as in the form of calcium bisulfite.

By use of the process of the present invention the calcium content of sodium-base waste sulfite liquor can be reduced. If desired, the calcium level can be reduced to below about 100 ppm and even to about 50 ppm or lower (based on the weight of the waste sulfite liquor solution). When the calcium level is below about 100 to 150 ppm, the sodium-base waste liquor can be more effectively and economically processed to recover sodium and other valuable components employing such techniques as evaporators, recovery boilers, absorbers and the like. This is because the scaling, if any, which occurs at such low calcium levels is not economically prohibitive. An additional advantage in obtaining low calcium levels is that the scaling problem which occurs in various pulping process equipment will be minimized, if not eliminated, for example, when sodium cation is recovered for use in making fresh cooking liquor.

As previously mentioned, the sodium and/or ammonium compound is selected from the class consisting of sodium oxide, sodium sulfite, sodium bisulfite, sodium carbonate, sodium hydroxide, anhydrous ammonia, ammonium sulfite, aqueous ammonia, ammonium carbonate, ammonium magnesium carbonate and ammonium hydroxide. These sodium and ammonium compounds are soluble in sodium-base waste sulfite liquor or can be made soluble therein by increasing the sulfite ion concentration of the liquor. Mixtures of the sodium or ammonium compounds or combinations thereof may be employed, for example, aqueous ammonia and ammonium sulfite, or sodium sulfite and sodium bisulfite or sodium sulfite and ammonium sulfite. Preferably, sodium hydroxide, or aqueous ammonia or either in combination with sodium sulfite or ammonium sulfite is used.

In addition to the sodium or ammonium compound, "additional" calcium is also dissolved in the sodium-base waste sulfite liquor, that is, in excess of the original amount of calcium present in the sodium-base waste sulfite liquor obtained from the pulping process.

The source of additional calcium may be any compound or material which will dissolve (or be dissolved by the presence of sulfite ions) in the sodium-base waste sulfite liquor to provide dissolved calcium, i.e., calcium ions, therein. The calcium compound or material used should not cause adverse side reactions, interfere with the precipitation of calcium sulfite and its recovery or add any deleterious substance to the waste sulfite liquor. Several calcium compounds that may be used include calcium hydroxide, calcium oxide, calcium carbonate, chalk, limestone, dolomite and calcium sulfite.

Any "additional" amount of calcium may be dissolved in the sodium-base waste sulfite liquor in accordance with the present invention. As previously mentioned, the additional calcium will enable the desired calcium reduction to take place with the use of less sodium or ammonium compound and less sulfite ions. In other words, if it is desired to reduce the calcium content of a sodium-base waste sulfite liquor from 300 ppm, for example, to 100 ppm, less sodium or ammonium compound and less sulfite ion will be used when additional calcium is added as compared to when no additional calcium is added.

Preferably, the "additional" calcium is dissolved in amounts such that the waste sulfite liquor contains up to about 4,000 ppm and most preferably between about 1,000 and 2,500 ppm of calcium dissolved therein, based on the weight of the waste sulfite liquor solution (this includes the calcium already dissolved in the original waste liquor obtained from the pulping process). It has been found that little additional improvement is obtained when more than about 4,000 ppm of dissolved calcium are contained in the waste sulfite liquor. However, higher amounts of dissolved calcium can be used if so desired.

A particularly preferred method for reducing the calcium content of sodium-base waste sulfite liquor includes dissolving one or more of the above calcium compounds in the spent liquor to obtain between about 1,000 and 2,500 ppm of calcium dissolved therein; and dissolving one or more of the above sodium and/or ammonium compounds in the liquor to obtain above about 14,000 ppm, preferably between about 16,000 and 29,000 ppm and most preferably between about 18,000 and 26,000 ppm of "sodium-ammonia cations" dissolved in the liquor.

The expression "sodium-ammonia cations" as used herein means the amount of sodium and the amount of ammonia, expressed as sodium equivalents, which are dissolved in the waste sulfite liquor. The ppm of dissolved ammonia are converted to the ppm of dissolved sodium equivalent by multiplying the ppm of ammonia by a factor of 1.353. The ppm of sodium and the ppm of the sodium equivalent of ammonia are then added to give "sodium-ammonia cations" which are dissolved in the waste sulfite liquor.

If more than about 50 ppm of potassium and/or magnesium are dissolved in the sodium-base waste sulfite liquor, the respective amounts of potassium and magnesium should also be converted to sodium equivalents and included in the "sodium-ammonia cation" total. The ppm of dissolved potassium are multiplied by 0.588 and the ppm of dissolved magnesium by 1.893 to convert each to ppm of dissolved sodium equivalents.

It is important to note that the ppm of dissolved sodium, ammonia, magnesium and/or potassium are to include not only the amounts that may be added during the calcium removal treatment, but also the amounts present in the original sodium-base waste sulfite liquor obtained from the pulping process.

The above amounts of dissolved calcium and "sodium-ammonia cations" should be obtained in the sodium-base waste sulfite liquor solution before the calcium sulfite precipitation is complete. For example, some of the calcium, sodium and/or ammonium compound may be added as calcium sulfite is precipitating, provided the total desired amount is dissolved in the waste sulfite liquor before completing precipitation. With respect to the calcium, it is preferred that all of the additional calcium which is to be added be dissolved in the waste sulfite liquor before any calcium sulfite precipitation occurs, for example, prior to raising the pH of the waste sulfite liquor solution above about 4.0. In the instances when the pH of the spent liquor obtained from the pulping process is already above about 4.0, sulfite ions are usually first added to the liquor to lower the pH as discussed below.

In addition to the added calcium and the sodium or ammonium compound, the sodium-base waste sulfite liquor is also provided with a source of sulfite ions. The presence of sulfite ions in the waste sulfite liquor serves several functions. First, sufficient sulfite ions must be available to dissolve the sodium, ammonium and calcium compounds that are added to the waste sulfite liquor. In addition, sulfite ions must be provided to combine with calcium, and, under the reaction conditions used, to cause calcium to precipitate as calcium sulfite. Furthermore, the sulfite ions assist in adjusting the pH of the waste sulfite liquor, for example, by keeping the pH from rising above the desired level as the sodium, ammonium and calcium components are added.

Any convenient source of sulfite ions may be used in the present invention such as sulfur dioxide, sodium sulfite, ammonium sulfite and calcium sulfite. Preferably, sulfur dioxide, sodium sulfite or ammonium sulfite is used. In the instances when it is necessary to provide sulfite ions for purposes of dissolving calcium, sodium or ammonium compounds, the source of sulfite ion is normally sulfur dioxide.

The sulfite ions are usually provided in sufficient amount to adjust the pH so that at the completion of the dissolution of the added calcium and sodium and/or ammonium compound, the pH of the waste sulfite liquor is between about 5 and 8, preferably between about 5.5 and 6.5, and more particularly at about 6.0. Under these conditions, calcium contained in the waste sulfite liquor precipitates as calcium sulfite.

The calcium sulfite precipitate is separated from the remaining waste sulfite liquor solution by any conventional technique such as filtration, settling and the like.

The additional calcium, sodium, ammonium compound and sulfite ions may be added to the sodium-base waste sulfite liquor in any convenient manner known to those skilled in the art and in any order desired. One preferred sequence, however, is to maintain the pH of the waste sulfite liquor below about 4 (such as by the addition of sulfur dioxide) until all of the additional calcium to be added is dissolved and a major portion of the sodium or ammonium compound to be added is dissolved, and then add the remaining sodium or ammonium compound along with more sulfur dioxide, if needed, to reach the desired final pH.

The addition of the above substances to the waste sulfite liquor as well as the precipitation and separation of calcium sulfite precipitate from the remaining solution is conducted at any convenient pressure and temperature such as at atmospheric pressure and at a temperature of above about 50°C., for example, between about 60° and 100°C., and preferably between about 70° and 95°C. If desired, higher pressures and temperatures can be used provided adverse reactions are avoided.

Once the sodium and/or ammonium compound and added calcium are dissolved in the waste sulfite liquor solution and the final desired pH is obtained, up to about 30 minutes or more of residence time is usually sufficient to obtain completion of calcium sulfite precipitation.

After the calcium sulfite precipitate is removed from the remaining waste sulfite liquor solution it may be treated to obtain calcium compounds and sulfur dioxide. The waste solution remaining, i.e., filtrate, can be treated to obtain sodium compounds as well as other valuable components. This may be accomplished, for example, by concentrating the remaining solution by evaporation, and burning the concentrate under controlled conditions. Because of the reduced calcium level in the waste sulfite liquor, scaling problems are minimized and desirably eliminated. Other recovery processes known to those skilled in the art may also be employed. The recovered cooking chemicals may be used to prepare new sulfite cooking liquor, the preparation of which forms no part of the present invention. When an ammonium compound is added it may be recovered by replacement with a sodium compound before concentration of the filtrate.

The following examples illustrate methods of carrying out the present invention.

EXAMPLES

The following Table I contains a listing of eight experiments, denoted as Run Nos. 1 to 8, which were conducted to demonstrate the results that can be obtained by the process of the present invention.

Sodium-base waste sulfite liquor was obtained from a pulping process and was analyzed to determine its calcium and sodium contents. The original cooking liquor was a sodium acid sulfite form.

The sodium-base waste sulfite liquors used in the Runs 1 to 8 were found to contain about 985 ppm of calcium, all of which was dissolved in the liquor, and 8,250 ppm of sodium, as can be seen in Column 3 of Table I. All of the sodium was also dissolved in the liquor.

The pH of the liquors as received from the pulp mill was about 1.9.

In Runs 1 and 2 no additional calcium was added to the liquor. In Runs 3 to 8, additional calcium was added as indicated by the amount in Column 2. For example, in Run 3, 1,215 ppm were added to the waste sulfite liquor feed to obtain a total of 2,220 ppm. As indicated in Column 2, the additional calcium was dissolved in the liquor (WSL) prior to any calcium sulfite precipitation.

In each of the Runs 1 to 8 sodium hydroxide was also added to the waste sulfite liquor feed in order to dissolve sodium ions in the liquor. The amount of total sodium in the filtrate in each run is shown in Column 4. The difference between the amount of sodium in Column 4 and Column 3 indicates the amount of sodium dissolved in the waste liquor.

Sulfur dioxide was used in Runs 3 to 8 inclusive to assist in dissolving the calcium hydroxide in the liquor, and to adjust the pH of the liquor to a final value of 6.0. In each run, the liquor was held at the final pH of 6.0 for 30 minutes, with continuous stirring. The temperature of the liquor was held constant at 70°C.

At the end of the 30-minute period calcium sulfite precipitation had been completed. A sample of the solution was taken, the precipitate separated therefrom by filtration and the filtrate analyzed.

Column 5 of Table I lists the amount of calcium which remained dissolved in the filtrate.

TABLE I

| Run No. | Ca (ppm) Dissolved in WSL Prior to Precipitation | Na (ppm) Dissolved in WSL Obtained from Pulping Operation | Na (ppm) in Filtrate | Ca (ppm) in Filtrate |
|---|---|---|---|---|
| 1 | 985 | 8,250 | 22,500 | 638 |
| 2 | 985 | 8,250 | 26,300 | 300 |
| 3 | 2,200 | 8,250 | 17,450 | 1,984 |
| 4 | 2,200 | 8,250 | 20,750 | 1,078 |
| 5 | 2,225 | 8,250 | 24,500 | 128 |
| 6 | 2,275 | 8,250 | 28,250 | 73 |
| 7 | 3,280 | 8,250 | 23,200 | 138 |
| 8 | 3,300 | 8,250 | 26,300 | 103 |

As can be seen from the above Table, when calcium is added to the sodium-base waste sulfite liquor lower amounts of sodium are required. Compare, for example, Runs 2, 5 and 7. Similar results are obtained when other sodium and ammonium compounds such as sodium oxide, sodium sulfite, ammonium sulfite and anhydrous ammonia are used.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:

1. A process for treating sodium-base waste sulfite liquor containing calcium in order to reduce the amount of calcium contained therein by precipitating calcium from the waste sulfite liquor as calcium sulfite, which process comprises:
   a. dissolving in said waste sulfite liquor at least one member selected from the class consisting of sodium oxide, sodium sulfite, sodium carbonate, sodium bisulfite, sodium hydroxide, anhydrous ammonia, ammonium sulfite, aqueous ammonia, ammonium carbonate, ammonium magnesium carbonate, and ammonium hydroxide so as to obtain a waste sulfite liquor solution containing above about 14,000 ppm of sodium-ammonia cations dissolved therein prior to the completion of precipitation of said calcium sulfite;
   b. increasing the calcium ion concentration in said waste sulfite liquor prior to the completion of precipitation of said calcium sulfite;
   c. adding a source of sulfite ions to said waste sulfite liquor in at least an amount sufficient to cause the calcium contained therein to precipitate as calcium sulfite; and
   d. separating said precipitated calcium sulfite from the remaining waste sulfite liquor solution.

2. The process of claim 1 wherein said calcium ion concentration is increased by dissolving in said waste sulfite liquor a calcium compound selected from the class consisting of calcium hydroxide, calcium oxide, calcium carbonate, chalk, limestone and calcium sulfite.

3. The process of claim 2 wherein said calcium compound is dissolved in said waste sulfite liquor to obtain, prior to the completion of precipitation of said calcium sulfite, a waste sulfite liquor solution containing up to about 4,000 ppm of calcium dissolved therein.

4. The process of claim 2 wherein the sodium-base waste sulfite liquor to be treated contains between about 200 and 1,200 ppm of calcium, and wherein said calcium compound is dissolved in said waste sulfite liquor to obtain between about 1,000 and 2,500 ppm of calcium dissolved therein prior to the precipitation of calcium sulfite.

5. A process for treating sodium-base waste sulfite liquor containing calcium in order to reduce the amount of calcium contained therein by precipitating calcium from the waste sulfite liquor as calcium sulfite, which process comprises:
   a. dissolving in said waste sulfite liquor at least one member selected from the class consisting of sodium oxide, sodium sulfite, sodium carbonate, sodium bisulfite, sodium hydroxide, anhydrous ammonia, ammonium sulfite, aqueous ammonia, ammonium carbonate, ammonium magnesium carbonate, and ammonium hydroxide so as to obtain a waste sulfite liquor solution containing above about 14,000 ppm of sodium-ammonia cations dissolved therein prior to the completion of precipitation of said calcium sulfite;
   b. adding to said waste sulfite liquor a calcium compound selected from the class consisting of calcium hydroxide, calcium oxide, calcium carbonate, chalk, limestone and calcium sulfite so as to dissolve additional calcium in said waste sulfite liquor prior to the completion of precipitation of said calcium sulfite;
   c. adding to said waste sulfite liquor a member selected from the class consisting of sulfur dioxide, sodium sulfite, ammonium sulfite and calcium sulfite so as to provide sulfite ions in said waste sulfite liquor in at least an amount sufficient to cause the calcium contained therein to precipitate as calcium sulfite; and
   d. separating said precipitated calcium sulfite from the remaining waste sulfite liquor solution.

6. The process of claim 5 wherein the sodium or ammonium compound of step (a) is dissolved in said waste sulfite liquor in an amount sufficient to obtain a waste sulfite liquor containing between about 16,000 and 29,000 ppm of sodium-ammonia cations dissolved therein prior to the completion of precipitation of said calcium sulfite.

7. The process of claim 6 wherein said calcium compound is dissolved in said waste sulfite liquor to obtain, prior to the completion of precipitation of said calcium sulfite, a waste sulfite liquor solution containing between about 1,000 and 2,500 ppm of calcium dissolved therein.

8. The process of claim 6 wherein the sodium-base waste sulfite liquor to be treated contains between about 200 and 1,200 ppm of calcium, and wherein said calcium compound is dissolved in said waste sulfite liquor to obtain between about 1,000 and 2,500 ppm of calcium dissolved therein prior to the precipitation of calcium sulfite.

9. The process of claim 8 wherein the sodium or ammonium compound of step (a) is dissolved in said waste sulfite liquor in an amount sufficient to obtain a waste sulfite liquor containing between about 18,000 and 26,000 ppm of sodium-ammonia cations dissolved therein prior to the completion of precipitation of said calcium sulfite.

10. The process of claim 9 wherein the pH of the waste sulfite liquor solution is between about 5 and 8 during the calcium sulfite precipitation.

11. The process of claim 10 wherein the sodium-base waste sulfite liquor to be treated results from the use of a sodium bisulfite cooking liquor.

12. The process of claim 10 wherein the sodium-base waste sulfite liquor to be treated results from the use of a sodium acid sulfite cooking liquor.

13. The process of claim 12 wherein sulfur dioxide is added to provide the sulfite ions in said waste sulfite liquor, and wherein the pH of the waste sulfite liquor solution is between about 5.5 and 6.5 during the calcium sulfite precipitation.

* * * * *